Figure 1:
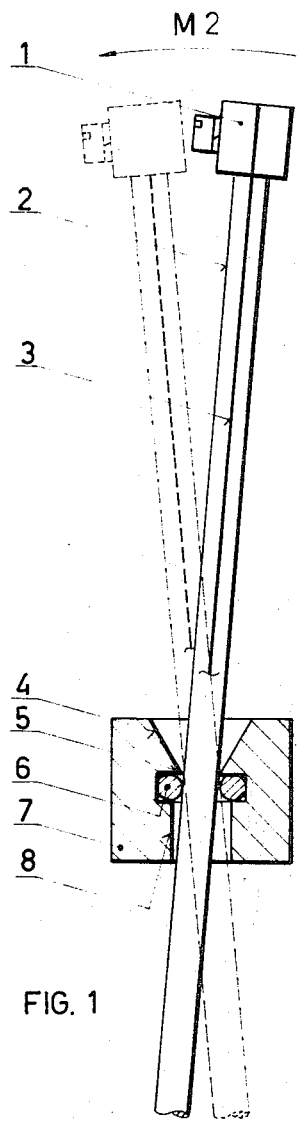

United States Patent [19]
Weiss

[11] 3,765,687
[45] Oct. 16, 1973

[54] SEALED LINK FOR INSTRUMENTS
[76] Inventor: Frank Weiss, 158 Deepwater Rd., Castle Cove, South Wales, Australia
[22] Filed: Sept. 29, 1971
[21] Appl. No.: 184,719

[30] Foreign Application Priority Data
Oct. 26, 1970  Australia.......................... 21494/70
Apr. 5, 1971  Australia.......................... 27350/71

[52] U.S. Cl............................ 277/8, 277/30, 74/86
[51] Int. Cl......................... F16j 15/00, F16j 15/16
[58] Field of Search ................. 277/5, 30, 174, 173, 277/8; 74/86, 18.1

[56] References Cited
UNITED STATES PATENTS
3,198,089  8/1965  McGay ........................... 277/174 X
3,087,341  4/1963  Hults................................... 74/18.1
3,201,094  8/1965  Ligon et al....................... 74/18.1 X
3,511,510  5/1970  Lindeboom.......................... 277/27

Primary Examiner—Samuel B. Rothberg
Attorney—Toren & McGeady

[57] ABSTRACT

A sealed link for use in instruments such as level transmitters and switches, differential pressure transmitters and indicators, and flowmeters in which a motion or a force due to pressure is transmitted. The sealed link consists of a link member which is positioned in an aperture in a gland having therein an O-ring or the like which provides the seal, the aperture in the gland on one side of the O-ring having conical bore and the aperture having a cylindrical bore on the other side of the O-ring. The link member is also provided with means to inhibit its axial movement within the aperture in the gland.

2 Claims, 4 Drawing Figures

Patented Oct. 16, 1973

3,765,687

2 Sheets-Sheet 1

M1

INVENTOR
FRANK WEISS

BY
Town and McGrady
ATTORNEYS

SEALED LINK FOR INSTRUMENTS

This invention relates to sealed links used in instruments such as level transmitters, level switches, differential pressure indicators, differential pressure transmitters, differential pressure switches, flowmeters of the target type and the like. These links transfer either a motion or a balanced force from a pressurised space to a space which is under atmospheric pressure, where the said motion or balanced force is applied to means for indicating, recording, switching, controlling or transmitting process variables which are related to this motion or force.

Many known constructions of instrument links use flexible diaphragms or metal bellows for the seal of these links which in turn introduce directional forces which are undesirable, These directional forces often vary in relation to the static pressure to be sealed and adversely affect the calibration.

These disadvantages are overcome in the present invention which provides a sealed link for instruments, comprising; a link member extending through an aperture in a gland, said aperture being provided intermediate its ends with an annular groove for receiving a corresponding ring of resilient material to sealingly engage said link, which groove adjoins, on the side of the gland adapted to be located in a pressurised space, a cylindrical bore of diameter larger than that of the link member passing therethrough, and which adjoins on the opposite side of the gland a conical bore having formed at its smaller end, which smaller end is nearest said groove, an annular knife edge around which the link member is able to describe limited tilting, oscillating and nutating movements; and means attached to said link member for inhibiting axial movement of said member within said aperture, said inhibiting means being arranged either in a plane passing through the longitudinal axis of the link member or in a plane parallel to but spaced apart from the longitudinal axis of the link member.

Figure 2:
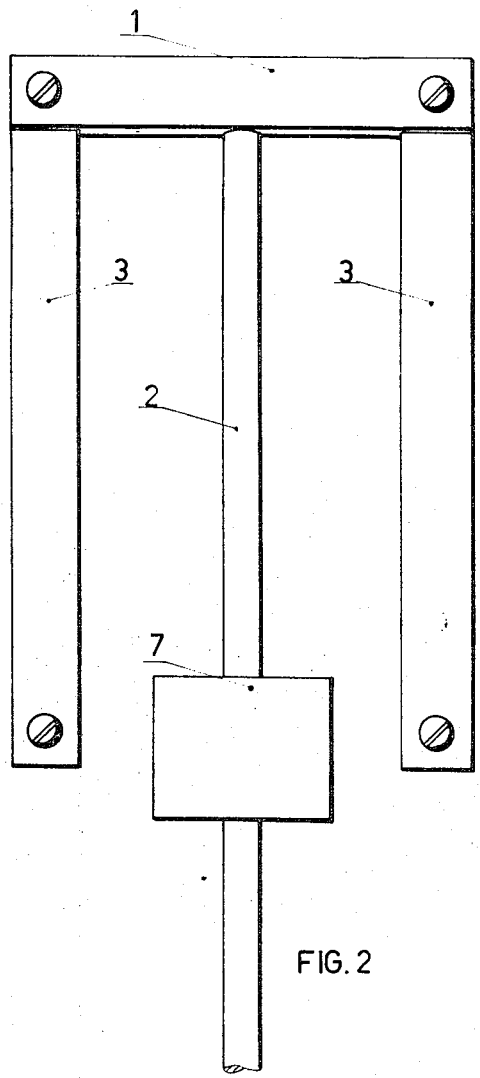
Figure 3:
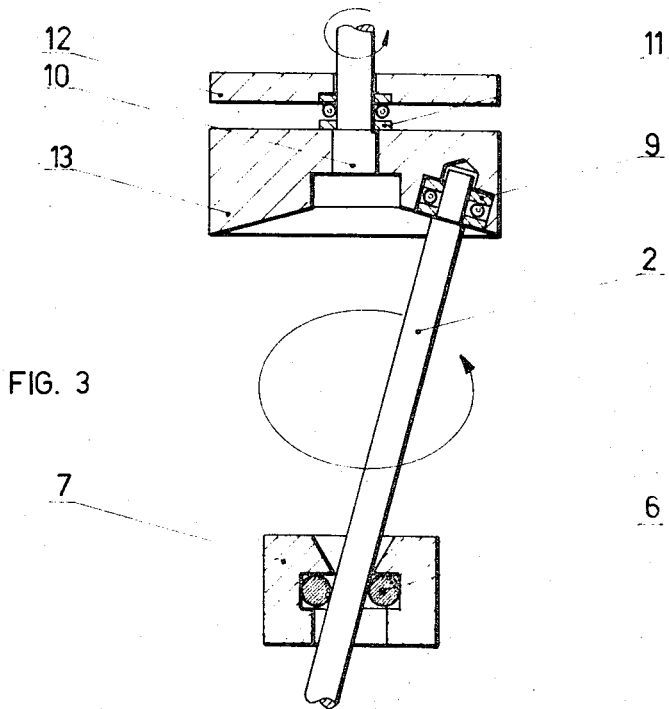
Figure 4:
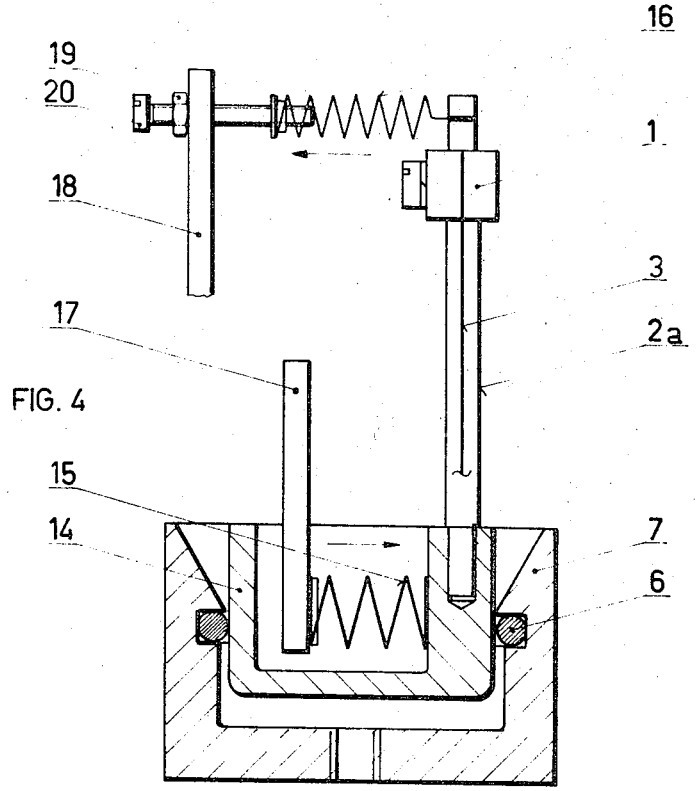

In order that the invention may be better understood, preferred embodiments of the invention are hereinafter described, by way of example only, with reference to the drawings in which;

FIG. 1 is a sectional side view of the sealed link according to one embodiment of the present invention, FIG. 2 is a front view of the sealed link of FIG. 1, FIG. 3 is a sectional side view of a second embodiment of the invention, and FIG. 4 is a sectional side view of the third embodiment of the invention.

In FIG. 1 a link member in the form of a rod 2 is tilted from its position shown in dotted lines under the influence of momentum M 1 created by diaphragms, floats, targets or by similar means, located in a pressurised space, towards the position shown in unbroken lines counteracting the momentum M 2 created by springs, force balance systems or similar means located in a space at atmospheric pressure. The sliding movement of the rod 2 in the axial direction is inhibited by inhibiting means in the form of a transverse member 1 carrying the flexible leaf members 3 fastened at their lower ends to a rigid structure (not shown). The rod 2 passes through an aperture in a gland 7 which is provided with a groove for a ring of resilient material 6 conveniently an O-ring. This groove adjoins on the pressruized side a cylindrical bore 8 which is of substantially larger diameter than the rod 2 as the sealing section is required only on the opposite side of the O-ring 6. The conical bore 4 intersects the groove of the O-ring 6 in the form of an annular knife edge 5 the diameter of which equals the diameter of the rod 2 plus a clearance which must not be bigger than the value required by the sealing action of the O-ring. This clearance allows for a limited tilting movement of the rod 2 which movement is sufficient for instruments using either the force balance principle or the magnification of the movement by the quadrant and pinion amplifier or snap acting switches. The cross section of the rod 2 and the internal shape of the gland 7 may also be of elliptical or a quasi-elliptical form limited by two semicircles and two straight and parallel sides, or of any other cross section the circumference of which has no corners.

FIG. 3 shows an embodiment of the invention in which the rod 2 carries out a nutating movement applicable to water meters and similar instruments. It can be seen in FIG. 3 that the rod 2 passing through the gland 7 with the O-ring 6 can carry out a nutating motion if its lower end is suitably attached to the spinning member of a water meter whereas the axial thrust of the said rod 2 can be balanced by a thrust-bearing assembly consisting of ball bearings 9 and 11, thurst plate 12 and disc 13 which is fastened to shaft 10 carrying out a rotating movement.

FIG. 4 shows an application in hich the inhibiting means are arranged parallel but distanced from the axis of the member 14 and is applicable to pressure switches and the like. The embodiment according to FIG. 4 shows that the link member 14 can carry out a limited tilting movement in gland 7 fitted with O-ring 6 if a pressure is applied to the lower end of the said gland 7. As the inhibiting means consisting of rod 2a partially shown leaf member 3 and transverse member 1 are arranged parallel but spaced apart from the axis of member 14 the pressure applied to the lower end of gland 7 will create a tilting force which can be counter balanced by a spring 16 adjustable by nut 19 screw 20 fastened to holder 18. Spring 15 anchored on thrust plate 17 will press member 14 against the right hand portion of the knife edge of gland 7 around which the sealed member 14 can carry out a limited tilting motion so that transverse member 1 can operate switching means (not shown) if pressure is applied to the lower end of gland 7.

It will be seen that the same effect can be achieved if rings of cross section other than circular are used, e.g., rings of U-shaped cross section (known by the name of "U caps") and that the rings can be made of any resilient material.

I claim:

1. A sealed link for instruments, comprising a gland having an aperture extending therethrough, a link member extending axially through said aperture in said gland, said aperture having an annular groove formed therein intermediate its ends, a ring of resilient material seated within said annular groove and arranged in sealing engagement with said link, said gland adapted to have one end of said aperture located in a pressurized space, said aperture having a cylindrically shaped surface extending axially from said annular groove to the end of said aperture adapted to be located in the pressurized space, said cylindrical surface having a diameter greater than the corresponding dimension of said link member passing therethrough, said aperture having a conically shaped surface extending from said annular groove to the opposite end of said aperture from the end adapted to be located in the pressurized space and the smaller diameter end of said conically shaped surface located adjacent said annular groove with its larger diameter end spaced axially therefrom and the smaller diameter end forming an annular knife edge around which said link member is able to describe limited tilting, oscillating and nutating movements, and means attached to said link member for inhibiting axial movement of said link member within said aperture, said inhibiting means comprising a transverse member affixed to said link member at a position spaced from said gland and two flexible leaf members, each said leaf member affixed at one end to an end of said transverse member and arranged at its other end to be affixed to a rigid structure, said flexible leaf members being arranged in one of a plane passing through the longitudinal axis of the link member and of a plane parallel to but spaced apart from the longitudinal axis of said link member.

2. A sealed link for instruments, comprising a gland having an aperture extending therethrough, a link member extending axially through said aperture in said gland, said aperture having an annular groove formed therein intermediate its ends, a ring of resilient material seated within said annular groove and arranged in sealing engagement with said link, said gland adapted to have one end of said aperture located in a pressurized space, said aperture having a cylindrically shaped surface extending axially from said annular groove to the end of said aperture adapted to be located in the pressurized space, said cylindrical surface having a diameter greater than the corresponding dimension of said link member passing therethrough, said aperture having a conically shaped surface extending from said annular groove to the opposite end of said aperture from the end adapted to be located in the pressurized space and the smaller diameter end of said conically shaped surface located adjacent said annular groove with its larger diameter end spaced axially therefrom and the smaller diameter end forming an annular knife edge around which said link member is able to describe limited nutating movement, and means attached to said link member for inhibiting axial movement of said link member within said aperture, said inhibiting means comprising a thrust-bearing assembly including a thrust plate and a disc rotatably mounted thereon, one end of said link member being eccentrically and rotatably attached to said disc.

* * * * *